H. COHIC.
VEHICLE TOP RAISING AND LOWERING DEVICE.
APPLICATION FILED OCT. 8, 1915.
1,184,422.
Patented May 23, 1916.
2 SHEETS—SHEET 1.
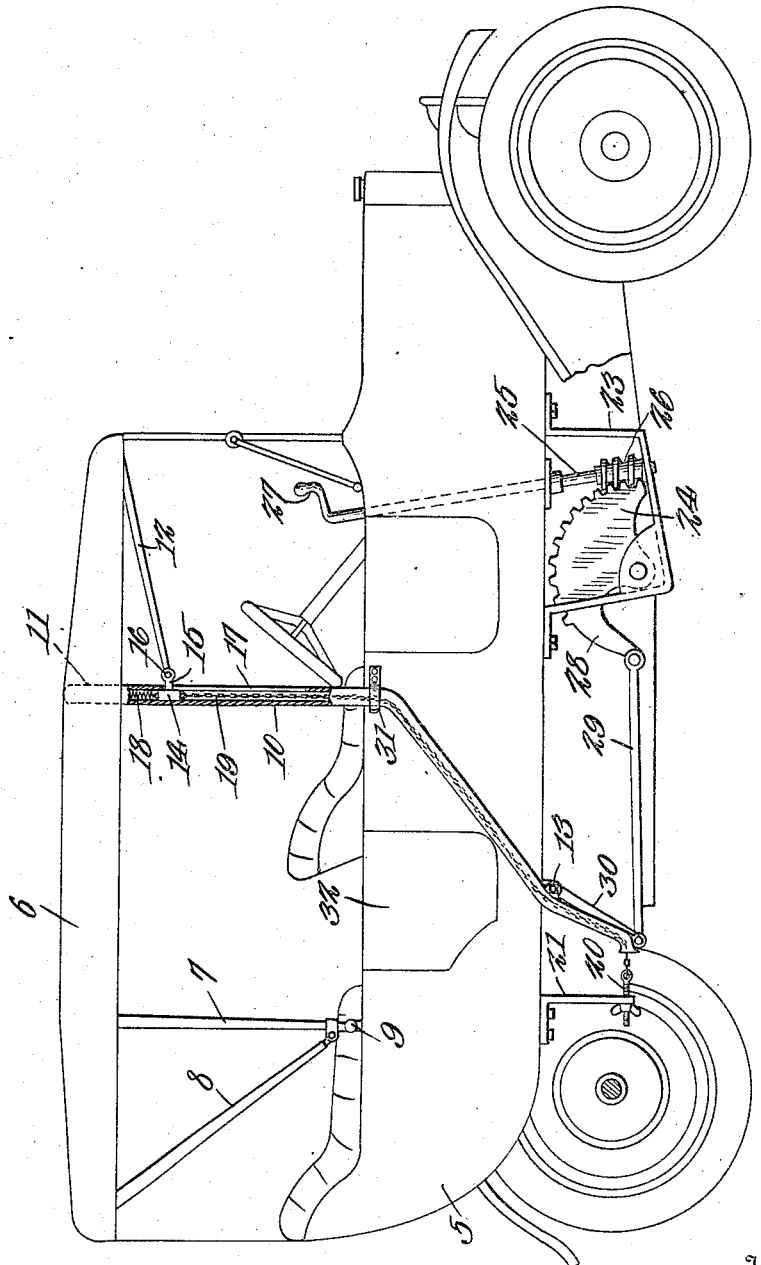
Henry Cohic
Inventor

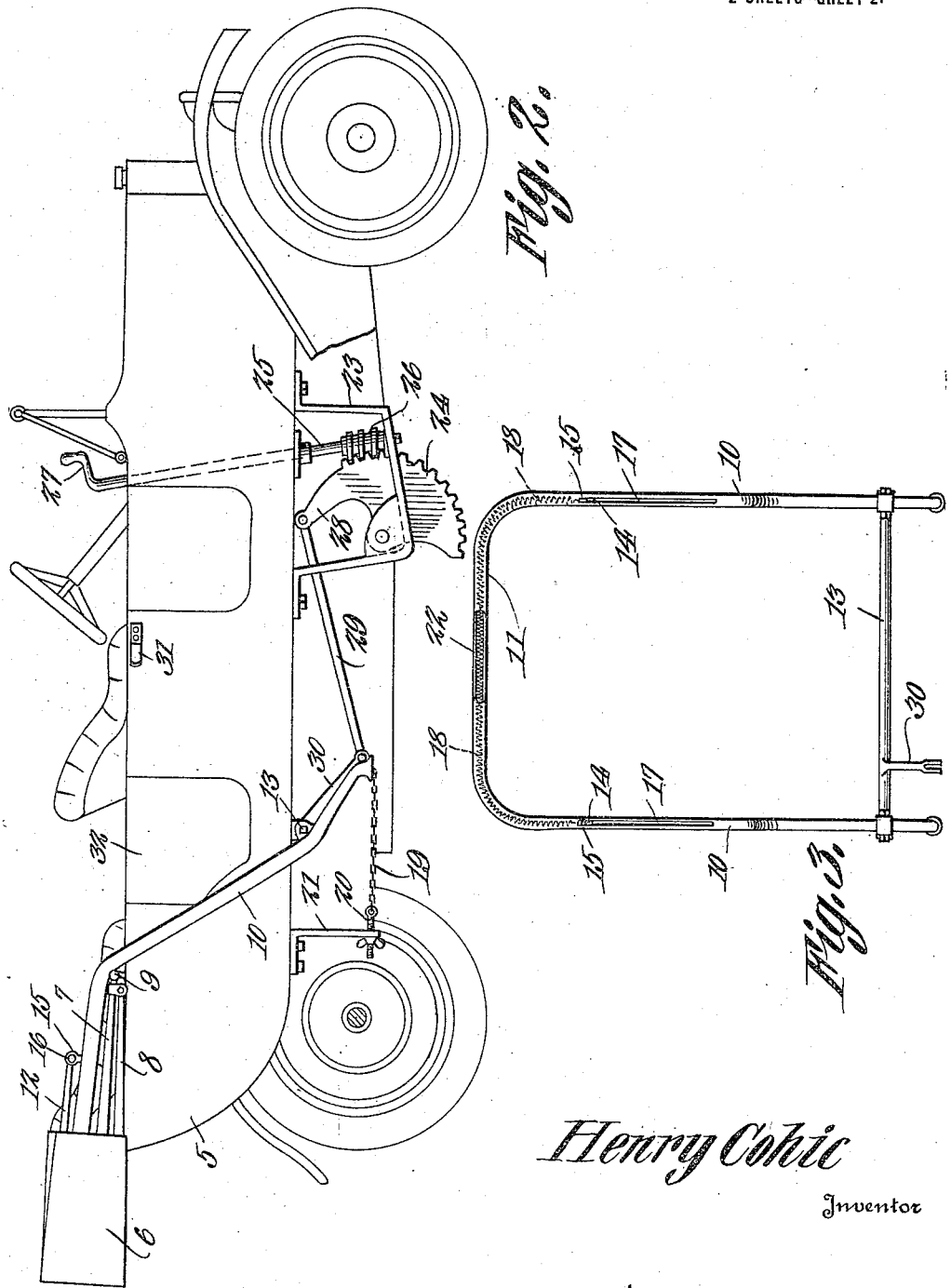

UNITED STATES PATENT OFFICE.

HENRY COHIC, OF CLEVELAND, OHIO.

VEHICLE-TOP RAISING AND LOWERING DEVICE.

1,184,422.  Specification of Letters Patent.  Patented May 23, 1916.

Application filed October 8, 1915. Serial No. 54,856.

*To all whom it may concern:*

Be it known that I, HENRY COHIC, a citizen of the United States, residing at Cleveland, in the county of Cuyahoga and State of Ohio, have invented certain new and useful Improvements in Vehicle-Top Raising and Lowering Devices, of which the following is a specification.

This invention relates to devices for raising and lowering the tops of vehicles, and more particularly the tops of automobiles.

The invention has for its object to provide a mechanism by which the top of the car may be easily raised or lowered by the driver without the latter getting out of the car.

A further object of the invention is to provide a device of the kind stated which is simple in construction, and one which can be readily applied.

The objects stated are attained by means of a novel combination and arrangement of parts to be hereinafter described and claimed, reference being had to the accompanying drawings, in which—

Figure 1 is a side elevation showing the top in raised position; Fig. 2 is a similar view showing the top lowered, and Fig. 3 is an elevation of one of the bows of the top.

Referring specifically to the drawings, 5 denotes the body of the vehicle, the same being provided with a collapsible top 6. The vehicle here shown is a motor car, but it is to be understood that the invention is not limited to automobile tops, but may, with equal facility, be applied to the tops of other vehicles. The top 6 is supported at its rear end by a main rear bow 7 and a rear brace bow 8, as usual, the main bow being pivoted to the car body 5 in the ordinary manner, so that the top may be collapsed or folded, and swung back out of the way, in which position it is supported by props 9 on the sides of the car body. The parts thus far described are all constructed and arranged in an old and well known manner and nothing is claimed therefor, in view of which a further description thereof is deemed unnecessary.

The forward portion of the top 6 is supported by a main front bow and a front brace bow extending forwardly therefrom. The main front bow is composed of side arms 10 and a top connection 11. The front brace bow is shown at 12. The width of the main front bow is such that it straddles the car body 5, and the length of the side arms of said bow is such that they extend down the sides of the car body and below the same for a short distance. The side arms 10 are fastened near their lower ends on a rock shaft 13 extending transversely beneath the car body and supported by the latter in any approved manner. This shaft provides a pivotal support for the main front bow so that the latter may be swung to raise and lower the top 6 as will be presently described.

The side arms 10 and the connecting top part 11 of the front main bow are hollow, and in the side arms are mounted slide blocks 14 having stems 15 to which the branches of the front brace bow 12 are pivoted, as indicated at 16. The side arms 10 have longitudinal slots 17 through which the stems 15 pass. The slides seating in the respective side arms 10 are connected by a coiled spring 18 located in the connecting part 11. To each slide is also connected a chain, cable or other suitable hauling device 19 which passes down through the side arm and is connected at its lower end to a screw 20 carried by a bracket 21 mounted on the bottom of the car body 5. By means of the screws 20, the length of the chains 19 may be regulated, which, in turn, regulates the tension of the spring 18. The part 11 has an opening 22 for the insertion of the spring 18.

Beneath the front portion of the car body 5 is mounted a bracket 23 which supports a gear sector 24 and an upright shaft 25 provided with a worm 26, which latter is in mesh with the gear sector. The shaft 25 passes through the floor of the car body and rises therefrom to a suitable height so as to bring a crank handle 27 on its upper end within easy reach of the driver. On the gear sector 24 is an arm 28 which is connected by a link 29 to a rocker arm 30 on the shaft 13. Upon turning the shaft 25, the shaft 13 is rocked through the worm 26, the gear sector 24, the link 29 and the rocker arm 30, whereby the main front bow and the brace bow carried thereby, are swung. When the main front bow is in upright position, the side arms 10 thereof engage cleats 31 on the sides of the car body, said cleats limiting the forward swing of the bow, and also serving as hand-holds when boarding the car.

Fig. 1 shows the top 6 in raised position. The spring 18 draws the slides 14 upward and holds the brace bow properly positioned near the top of the main front bow, the upward movement of the slides being limited by the slots 17. To lower the top, the shaft 25 is operated to rock the shaft 13 in a direction to swing the bow arms 10 rearward and downwardly until they rest on the props 9. As the lower ends of the chains 19 are fixed, it will be seen that when the main bow swings down, the chains are pulled down, thereby drawing the slides 14 down in the bow arms 10 until the brace bow 12 folds flat thereagainst and in front of the main bow. This downward movement of the slides places the spring 18 under tension, so that when the main front bow is again swung upward to raise the top, the slides 14 are drawn upward to unfold and project the brace bow. The spring also has a tendency to help raise the top, as well as to keep it stretched taut when up. To raise the top it is necessary only to turn the shaft 25 in a direction to swing the main bow upward and forward until stopped by the cleats 31, the brace bow 12 automatically unfolding and assuming the proper position as the chains 19 pay out. It will be noted that the bow arms 10 are curved to clear the rear door 32 of the car when in either position.

The preferred embodiment of the invention has been shown, but it will be understood that various changes and modifications in the structural details may be made without departure from the spirit and scope of the invention as hereinafter claimed.

I claim:—

1. The combination with a foldable vehicle top; of a swinging main front bow pivoted to the vehicle body and supporting the corresponding end of the top, a front brace bow foldable against said main bow, a support for the front brace bow having a sliding connection with the main front bow, means for swinging the main front bow to raise and lower the top, and means actuated by the swing of the main front bow for operating the brace bow supports to fold and unfold the brace bow.

2. The combination with a foldable vehicle top; of a swinging main front bow supporting the corresponding end of the top, a front brace bow foldable against said main bow, a support for the front brace bow having a sliding connection with the main front bow, a rock shaft carrying the main front bow, a rocker arm on said shaft, a gear linked to the rocker arm, a worm in mesh with the gear, an actuating shaft for the gear, and means actuated by the swing of the main front bow for operating the brace bow supports to fold and unfold the brace bow.

3. The combination with a foldable vehicle top; of a swinging main front bow pivoted to the vehicle body and having hollow side arms and supporting the front end of the top, a front brace bow foldable against said main bow, slides mounted in the aforesaid side arms, to which slides the branches of the brace bow are pivoted; means for swinging the main front bow to raise and lower the top, and means actuated by the swing of the main front bow for operating the slides to fold and unfold the brace bow.

4. The combination with a foldable vehicle top; of a swinging main front bow having hollow side arms and supporting the front end of the top, a front brace bow foldable against said main bow, slides mounted in the aforesaid side arms, to which slides the branches of the brace bow are pivoted; means for swinging the main front bow to raise and lower the top, means for lowering the slides to fold the brace bow, and a spring connected to the slides, said spring being tensioned when the slides are lowered.

5. The combination with a foldable vehicle top; of a swinging main front bow having hollow side arms and supporting the front end of the top, a front brace bow foldable against said main bow, slides mounted in the aforesaid side arms, to which slides the branches of the brace bow are pivoted; means for swinging the main front bow to raise and lower the top, pulling devices anchored at one end and connected at the other end to the slides, the first mentioned ends of the pulling devices extending from the aforesaid side arms, and a spring connected to the slides, said spring being tensioned when the slides are pulled down by the pulling devices.

6. The combination with a foldable vehicle top; of a swinging main front bow supporting the corresponding end of the top, a front brace bow foldable against said main bow, supports for the front brace bow having a sliding connection with the main front bow, means for swinging the main front bow to raise and lower the top, means for lowering the slides to fold the brace bow, and a spring connected to the slides, said spring being tensioned when the slides are lowered.

7. The combination with a foldable vehicle top; of a swinging main front bow supporting the corresponding end of the top, a front brace bow foldable against said main bow, supports for the front brace bow having a sliding connection with the main front bow, means for swinging the main front bow to raise and lower the top, pulling devices anchored at one end and connected at the other end to the slides, and a spring connected to the slides, said spring being tensioned when the slides are pulled down by the pulling devices.

In testimony whereof I affix my signature in presence of two witnesses.

HENRY COHIC.

Witnesses:
JULIAN KERYSINSK,
C. V. HULL.

Copies of this patent may be obtained for five cents each, by addressing the "Commissioner of Patents, Washington, D. C."